Sept. 20, 1960             J. B. RITCHIE            2,953,373
APPARATUS FOR USE IN TEACHING AN ASPIRING
SWIMMER TO FLOAT IN WATER
Filed March 19, 1958                               3 Sheets-Sheet 1
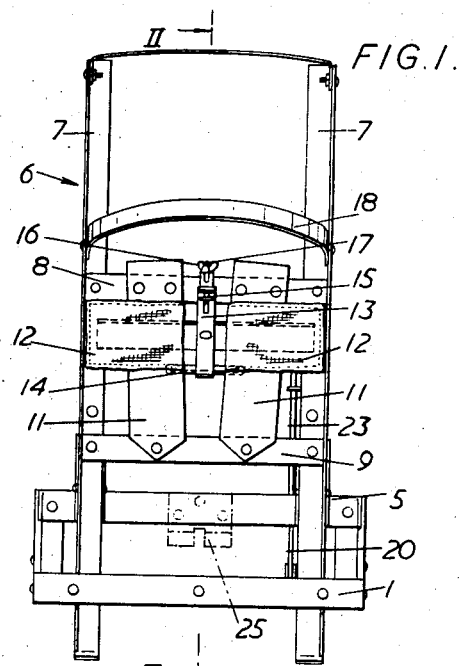
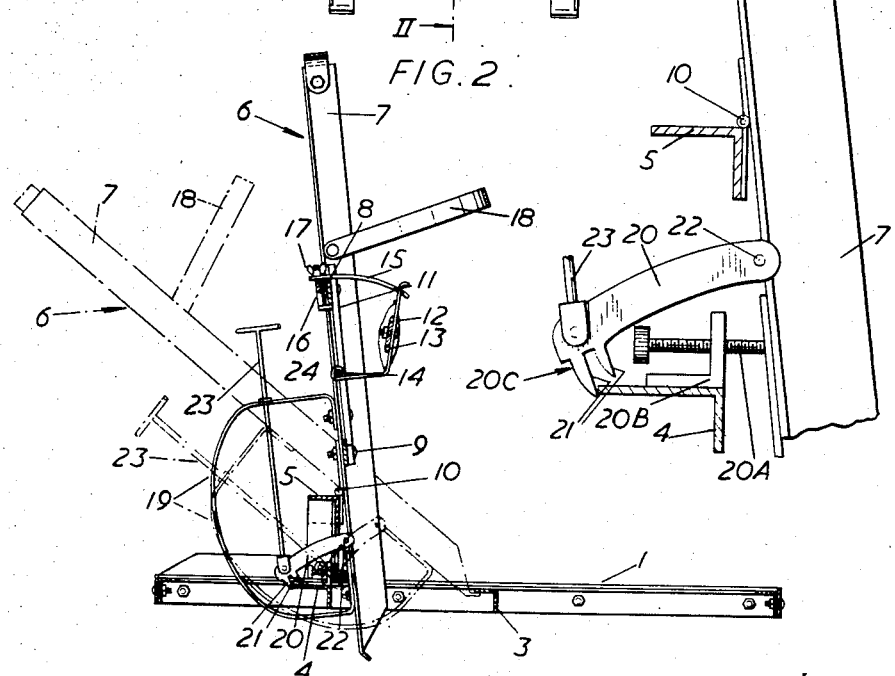
Inventor
JOHN BLAIR RITCHIE
By
Mason, Fenwick & Lawrence
Attorneys Sept. 20, 1960 J. B. RITCHIE 2,953,373
APPARATUS FOR USE IN TEACHING AN ASPIRING
SWIMMER TO FLOAT IN WATER
Filed March 19, 1958 3 Sheets-Sheet 2
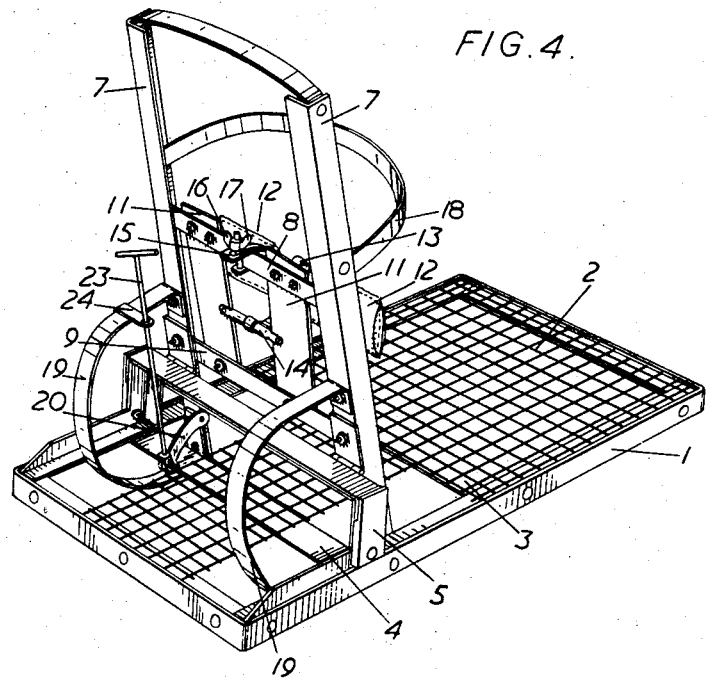
FIG.4.
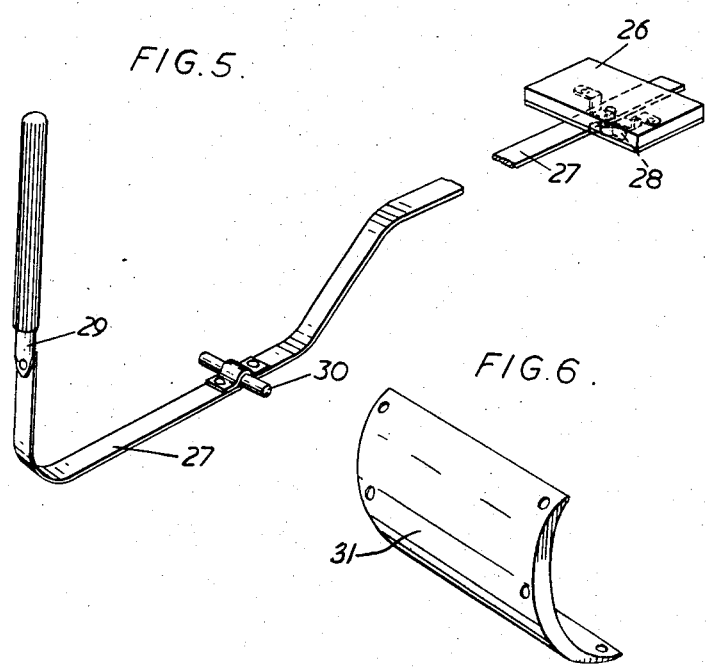
FIG.5.
FIG.6.
Inventor
JOHN BLAIR RITCHIE
By Mason, Fenwick & Lawrence
Attorneys

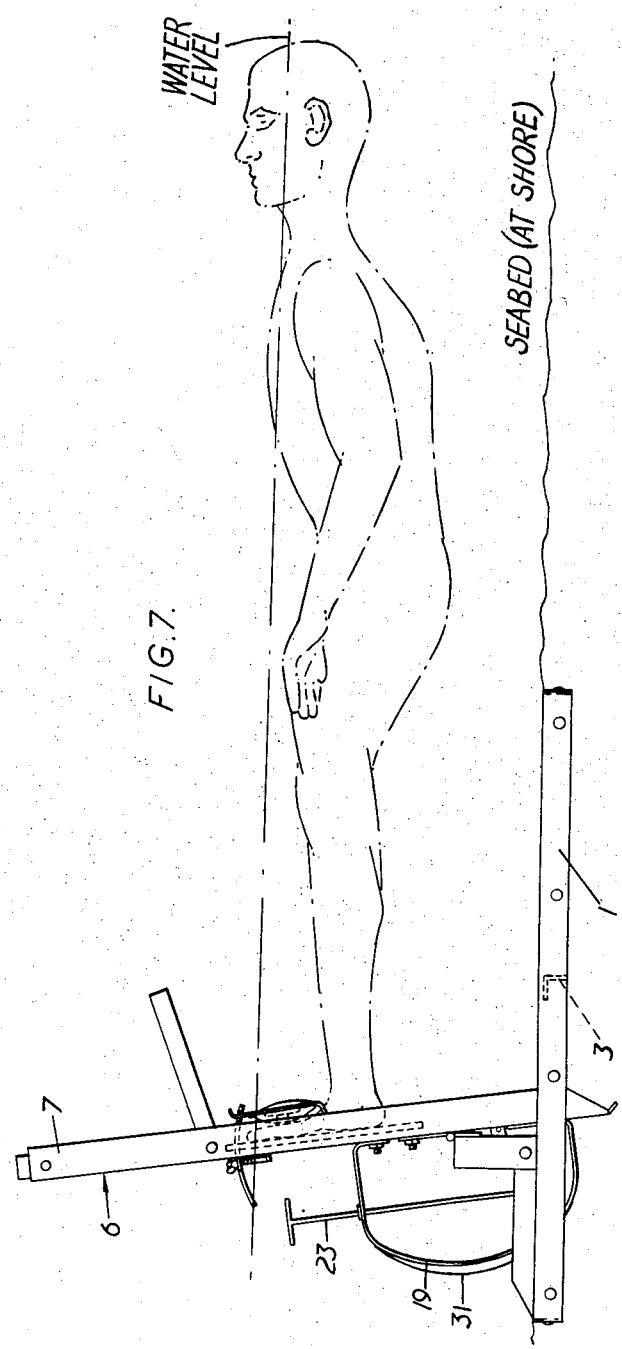

United States Patent Office 2,953,373
Patented Sept. 20, 1960

2,953,373

APPARATUS FOR USE IN TEACHING AN ASPIRING SWIMMER TO FLOAT IN WATER

John Blair Ritchie, 51 Lounsdale Drive, Renfrewshire, Paisley, Scotland

Filed Mar. 19, 1958, Ser. No. 722,426

Claims priority, application Great Britain Mar. 27, 1957

4 Claims. (Cl. 272—1)

This invention relates to apparatus for use in teaching an aspiring swimmer to float in water.

It is an object of the invention to provide an apparatus for the purpose aforesaid, to be located in a relatively shallow depth of water.

According to the present invention, I provide apparatus for teaching an aspiring swimmer to float, the apparatus comprising a base, a frame, means mounting said frame on said base for pivotal movement in an upward direction therefrom about an axis transverse to both, means adapted to lock said frame against movement relative to said base at a plurality of different angles of upward extension therefrom, and means carried by said frame to grip the feet of a user, said means being adjustable to accommodate different foot sizes.

Preferably also, the adjustable feet-gripping means comprises a pair of laterally-spaced foot supports rigidly mounted on the frame and each having associated therewith a clamping pad adjustable relative thereto.

The frame may be provided adjacent its lower end with a pair of rearwardly curved runners adapted for passage through apertures in the base as the angle between the base and frame decreases so that the apparatus is supported on the runners for convenient movement by dragging. Moreover, a pan may be provided extending between the runners to facilitate dragging of the apparatus over soft sand.

A forwardly extending handrail is preferably provided adjacent the top of the frame to assist the aspiring swimmer to position and secure his feet.

The apparatus according to the present invention is especially, but not exclusively, suitable for use on the seashore.

Preferably, the lower end of the frame projects below the base in the upright position of the frame, whereby said lower end may be driven into the shore to anchor the apparatus.

An embodiment of the invention will now be described, by way of example, with reference to the accompanying drawings, in which:

Fig. 1 is a front elevation of apparatus in accordance with the invention;

Fig. 2 is a side elevation of the apparatus, showing the frame in two alternative positions;

Fig. 3 is a detail view of part of Fig. 2;

Fig. 4 is a rear perspective view of the apparatus;

Fig. 5 is a perspective view of a device for use with the apparatus to give body support;

Fig. 6 is a perspective view of a pan which may be incorporated in the apparatus to bridge the runners thereof; and Fig. 7 is a side elevation of the apparatus showing a user in the floating position.

Referring to Figs. 1 to 4, apparatus for use in shallow water at the seashore for teaching an aspiring swimmer to float comprises a base and a feet-gripping device pivotally mounted on said base.

The base 1 comprises an enclosed rectangular frame partly covered by wire netting 2 secured thereto, longitudinally spaced front and rear ties 3 and 4, respectively, extending between the side members of the base frame and secured thereto, and a transverse upright bridge member 5 secured across the base frame above the rear tie 4.

The feet-gripping device comprises an inverted U-shaped frame 6, the limbs 7 of which are angle irons pivotally hinged to the bridge member 5 at a position intermediate their ends such that their free ends project below the base in the upright position of the frame 6, whereby the free ends may be pushed into the beach to anchor the apparatus, the ends being suitably tapered, as shown in Fig. 2.

Upper and lower transverse bars 8 and 9, respectively, are suitably located between said limbs 7 above the pivot point 10, and feet-gripping means is secured to and extends between these transverse bars. Said feet-gripping means comprises a pair of laterally spaced longitudinally extending wooden foot supports 11 and a pair of rubber-encased clamping pads 12 adjustable to and from said foot-supports, the adjusting means comprising a substantially upright swing bar 13, pivotally mounted at one end on and between the foot supports on a pivot 14, having the clamping pads 12 secured to it at its midpoint and interconnected at its other end to a substantially horizontal member 15 whose free end is slotted to engage a screw-threaded shank 16 fixedly secured to the upper transverse bar 8. A wing nut 17 is provided on the screw-threaded shank 16 to tighten the horizontal member 15 against the transverse bar 8 and thus the clamping pads 12 can be held in the desired position relative to the foot supports 11.

A forwardly projecting curved handrail 18 is provided adjacent the top of the frame 6 to assist the user to position and secure his feet.

The U-shaped frame 6 is provided with a pair of runners 19 adapted for passage through the base frame 1 as the angle between the base 1 and frame 6 decreases so that the apparatus can be supported on the runners and dragged along by means of a handle provided on the frame 6.

Also, when the frame 6 is adjusted to the dragging position, the ends of the limbs 7 of the frame abut against the forward tie member 3 on the base 1 and lift the forward part of the base.

The frame 6 may be locked in any of three angular positions relative to the base 1. Thus, referring especially to Fig. 3, when the outer bite of a claw 20, having inner and outer bites 21, is caused to engage the rear side of transverse tie 4 and a stop screw 20A, threaded through a flange 20B on the tie 4, is caused to abut a limb 7, the frame 6 is locked at an angle slightly greater than a right angle to the base 1, to compensate for the usual slight declivity of a beach. Alternatively, the frame 6 may be locked in a position perpendicular to the base 1 by causing engagement of the inner bite of claw 20 with the rear side of tie 4, the screw 20A being adjusted to abut the limb 7 in its new position. Locking of the frame in a third or dragging position (as shown in broken lines in Fig. 2) is effected by engagement of the lower end of limbs 7 with the transverse tie 3 and engagement of the outer end surface 20C of claw 20 with the front of transverse tie 4.

The claw 20 is pivotally attached to the U-shaped frame 6 at 22 adjacent the lower end of the runners, the other end of said claw being pivotally secured to a plunger 23 sliding in an apertured flange 24 secured to one of the runners at its upper end. In operation, when the desired angle has been found, the plunger 23 is pushed downwards, thus bringing the claw 20 into engagement with the rear transverse tie 4.

When the apparatus according to the present invention is used in a shallow depth of water for instance by the seashore, the user firstly adjusts the angle between the frame 6 and base 1 to that shown in Fig. 3 so that the frame 6 appears perpendicular to the water surface. Grasping the handrail 18 the user then places his feet on the foot supports 11, adjusts the clamping pads 12 to grip his feet and tightens the wing nut 17 to secure the clamping pads in position. He is then free to practice the art of floating as indicated in Fig. 7, secure in the knowledge that his feet are anchored and bereft of the psychological disturbance normally attendant upon one in one's first experience in floating or swimming.

A bracket 25 which may be mounted on the bridge member 5 is adapted to receive a pivot pin 30 for pivotally mounting the device shown in Fig. 5 which may be used by parents supervising the tuition of children.

This device comprises a cushion member 26 adjustable along a flat bar 27 to engage the body of say a child using the apparatus and give added support and confidence. The cushion member is adjusted to a position where it supports the child's back just below the shoulder blades. A screw 28 serves for securing the cushion member 26 in its adjusted position. A handle 29 is provided to allow a person assisting the child to pivot the device about its pivot point 30 and adjust the cushion up or down as required. Thus, when the child has acquired sufficient confidence, the cushion member may be lowered, the child's feet still being anchored as hereinbefore described.

It will be manifest that various modifications may be envisaged without departing from the scope of the invention. For example, a pan 31 such as shown in Fig. 6 may be provided for releasable attachment to the runners 19, in the position shown in Fig. 7, to extend therebetween and facilitate dragging of the apparatus over soft sand, the rear portion of the wire netting 2 being removed to allow passage of the pan through the base of the apparatus.

I claim:

1. Apparatus for teaching an aspiring swimmer to float, the apparatus comprising a base, a frame, means mounting said frame on said base for pivotal movement in an upward direction therefrom about an axis transverse to both, means carried by said frame to grip the feet of a user, said means being adjustable to accommodate different foot sizes, and means adapted to lock said frame against movement relative to said base at a plurality of different angles of upward extension therefrom, said locking means comprising a member fixedly mounted across said base parallel to and spaced from said transverse axis, a claw, means mounting said claw on said frame for pivotal movement relative thereto about an axis also parallel to and spaced from said transverse axis, a plurality of bites at the end of said claw remote from the pivot axis of said claw, said bites being adapted each independently to engage said member at a different angle of upward inclination of said frame relative to said base, and a stop screw adjustable on said base to abut said frame.

2. Apparatus for teaching an aspiring swimmer to float, the apparatus comprising a base, a frame, means mounting said frame on said base for pivotal movement in an upward direction therefrom about an axis transverse to both, means adapted to lock said frame against movement relative to said base at a plurality of different angles of upward extension therefrom, a pair of laterally-spaced foot supports, means rigidly mounting said foot supports on said frame, a clamping pad spaced from each said foot support, means mounting each clamping pad for adjustment thereof relative to the associated foot support, and a pair of rearwardly curved runners mounted on said frame at the pivoted end thereof, said base having apertures for passage of said runners as the angle of upward extension of said frame from said base decreases on relative movement between said frame and said base, whereby the runners come below said base and support the apparatus for convenient movement by dragging.

3. Apparatus for teaching an aspiring swimmer to float, the apparatus comprising a base, a frame, means mounting said frame on said base for pivotal movement in an upward direction therefrom about an axis transverse to both, means adapted to lock said frame against movement relative to said base at a plurality of different angles of upward extension therefrom, a pair of laterally-spaced foot supports, means rigidly mounting said foot supports on said frame, a clamping pad spaced from each said foot support, means mounting each clamping pad for adjustment thereof relative to the associated foot support, a forwardly-extending handrail mounted adjacent the pivot-remote end of said frame to assist the aspiring swimmer to position and secure his feet in said foot supports, and a device mounted from said base for supporting the body of a user of the apparatus.

4. Apparatus as set forth in claim 2, including a pan mounting on and extending between said runners to facilitate dragging of the apparatus over soft terrain.

References Cited in the file of this patent

UNITED STATES PATENTS

| | | |
|---|---|---|
| 695,538 | De Clairmont | Mar. 18, 1902 |
| 2,035,549 | Jones | Mar. 11, 1936 |
| 2,377,131 | Conrad | May 29, 1945 |
| 2,645,482 | Magida | July 14, 1953 |

FOREIGN PATENTS

| | | |
|---|---|---|
| 581,839 | Great Britain | Oct. 25, 1946 |